(12) United States Patent
Sugashima

(10) Patent No.: US 10,749,878 B2
(45) Date of Patent: Aug. 18, 2020

(54) COMMUNICATION SYSTEM, COUNT VALUE SYNCHRONIZATION METHOD, AND COUNT VALUE SYNCHRONIZATION PROGRAM PRODUCT

(71) Applicant: DENSO CORPORATION, Kariya, Aichi-pref. (JP)

(72) Inventor: Takeshi Sugashima, Kariya (JP)

(73) Assignee: DENSO CORPORATION, Kariya (JP)

( * ) Notice: Subject to any disclaimer, the term of this patent is extended or adjusted under 35 U.S.C. 154(b) by 191 days.

(21) Appl. No.: 15/747,509

(22) PCT Filed: Aug. 4, 2016

(86) PCT No.: PCT/JP2016/072876
§ 371 (c)(1),
(2) Date: Jan. 25, 2018

(87) PCT Pub. No.: WO2017/026360
PCT Pub. Date: Feb. 16, 2017

(65) Prior Publication Data
US 2018/0219873 A1   Aug. 2, 2018

(30) Foreign Application Priority Data

Aug. 7, 2015   (JP) .................................. 2015-157233

(51) Int. Cl.
*H04L 9/32*    (2006.01)
*H04L 29/06*   (2006.01)
(Continued)

(52) U.S. Cl.
CPC ............. *H04L 63/123* (2013.01); *G09C 1/00* (2013.01); *H04L 9/12* (2013.01); *H04L 9/32* (2013.01)

(58) Field of Classification Search
CPC ................................. H04L 63/123; H04L 9/12
(Continued)

(56) References Cited

U.S. PATENT DOCUMENTS

| 6,247,059 B1 * | 6/2001 | Johnson ............... H04L 12/1868 370/390 |
| 2008/0098218 A1 * | 4/2008 | Sibigtroth ........... H04L 63/0428 713/168 |

(Continued)

*Primary Examiner* — Wasika Nipa
*Assistant Examiner* — Samuel Ambaye
(74) *Attorney, Agent, or Firm* — Posz Law Group, PLC

(57) ABSTRACT

A communication system includes multiple nodes connected with each other. Each of the multiple nodes generates a message authentication code using a count value of a counter. The multiple nodes include a transmission node and a reception node. The count value of the counter is includes a high-order count value and a low-order count value. In the transmission node, a normal message generation portion generates a normal message to include a transmission data, the low-order count value, and the message authentication code, and a synchronization message generation portion generates a synchronization message. In the reception node, a message verification portion verifies the received normal message, a resynchronization request portion transmits a resynchronization request of the counter to the transmission node, and a count value update portion updates the high-order count value stored in the reception count value storage portion when the synchronization message is received.

7 Claims, 5 Drawing Sheets

(51) Int. Cl.
  *G09C 1/00* (2006.01)
  *H04L 9/12* (2006.01)
(58) Field of Classification Search
  USPC .......................................................... 713/181
  See application file for complete search history.

(56) References Cited

U.S. PATENT DOCUMENTS

2014/0310530 A1   10/2014   Oguma et al.
2017/0195878 A1*   7/2017   Takemori .............. B60R 16/023

* cited by examiner

COMMUNICATION SYSTEM, COUNT VALUE SYNCHRONIZATION METHOD, AND COUNT VALUE SYNCHRONIZATION PROGRAM PRODUCT

CROSS REFERENCE TO RELATED APPLICATIONS

This application is a U.S. national stage application of International Application No. PCT/JP2016/072876 filed on Aug. 4, 2016 and is based on Japanese Patent Application No. 2015-157233 filed on Aug. 7, 2015, the disclosures of which are incorporated herein by reference.

TECHNICAL FIELD

The present disclosure relates to a communication system, a count value synchronization method, and a count value synchronization program product for authenticating a message in a communication system.

BACKGROUND

Conventionally, in message authentication in an in-vehicle network, each of ECUs counts a transmission number of message for each CANID (message identifier used in CAN protocol). Technique which enables the message communication to have resistance to replay attack by using the counted transmission number of message in generating of a message authentication code (MAC) is known (see Patent Literature 1).

PATENT LITERATURE

Patent Literature 1: JP 2013-98719 A

SUMMARY

In a conventional art, a count value of a transmission end deviates from a count value of a reception end when a missing message occurs by a reason that a gateway filters out a message, or the like. Thus, the verification results of MACs may mismatch with each other. In this case, resynchronization, which matches the count value of the transmission end with the count value of the reception end by broadcasting an initial value of a counter, needs to be executed.

In a communication manner, such as CAN, data amount transmittable in one message is relatively small. Thus, a count value is incapable of being transmitted at one time using one message. In this configuration, the resynchronization may take long time. In the conventional art, adding MAC to a count value to be transmitted for resynchronization is proposed for ensuring that the count value is not modified by an attack from a foreigner. This configuration increases a data amount transmitted for the resynchronization.

In view of the foregoing difficulties, it is an object of the present disclosure to provide a communication system, a count value synchronization method, and a count value synchronization program product for resynchronizing a counter at a high speed with ensured security.

According to an aspect of the present disclosure, the communication system includes multiple nodes connected with each other. Each of the multiple nodes generates a message authentication code using a count value of a counter. An integrity of a message transmitted and received among the multiple nodes is authenticated using the message authentication code. The multiple nodes include a transmission node and a reception node. The transmission node transmits the message and the reception node receives the message. The count value of the counter includes a high-order count value and a low-order count value. The high-order count value corresponds to a high-order of the count value of the counter. The low-order count value corresponds to a low-order of the count value of the counter.

The transmission node includes a transmission count value storage portion, a normal message generation portion, a synchronization message generation portion. The transmission count value storage portion stores the count value. The normal message generation portion increments the count value stored in the transmission count value storage portion each time a transmission request to another node is received, and generates a normal message to include a transmission data, the low-order count value, and the message authentication code. The transmission data is related to the transmission request. The low-order count value is acquired from the transmission count value storage portion. The message authentication code is generated based on the transmission data and the count value stored in the transmission count value storage portion. The synchronization message generation portion generates a synchronization message in response to a resynchronization request transmitted from the reception node. The synchronization message includes the high-order count value acquired from the transmission count value storage portion.

The reception node includes a reception count value storage portion, a message verification portion, a resynchronization request portion, and a count value update portion. The reception count value storage portion stores the count value. The message verification portion verifies the normal message that is received by verifying the message authentication code based on a content of the normal message and the count value stored in the reception count value storage portion. The resynchronization request portion transmits the resynchronization request of the counter to the transmission node when the message verification portion fails to authenticate an integrity of the normal message. The count value update portion updates the high-order count value stored in the reception count value storage portion with the high-order count value included in the synchronization message when the synchronization message is received.

When the verification of the received normal message fails, the reception node transmits the resynchronization request. After receiving the resynchronization request, the transmission node transmits the synchronization message that includes the high-order count value. The reception node that receives the synchronization message updates the high-order count value stored in own node. With this configuration, when the high-order count value updated with the high-order count value of the synchronization message that was received at a last time is not modified by a foreigner, the verification succeeds in case of the reception of the normal message. When the high-order count value updated with the high-order count value of the synchronization message that was received at the last time is modified by a foreigner, the verification fails in case of the reception of the normal message.

With the above-described configuration, when the resynchronization of the counter is performed, the high-order count value, which is a part of the counter value, is transmitted. Thus, the communication data traffic of the resynchronization can be reduced.

The above-described communication system can verify, based on the normal message received next time, whether the high-order count value updated with the high-order count value included in the synchronization message is modified. The message authentication code is not necessarily assigned to synchronization message. With this configuration, the communication data traffic of the resynchronization can be reduced, and the resynchronization is performed with ensured security by preventing data fraud, such as impersonation of the counter.

BRIEF DESCRIPTION OF DRAWINGS

The above and other objects, features and advantages of the present invention will become more apparent from the following detailed description made with reference to the accompanying drawings. In the drawings.

DETAILED DESCRIPTION

Hereinafter, embodiments of the present disclosure will be described with reference to the drawings.

1. Configuration

Figure 1:
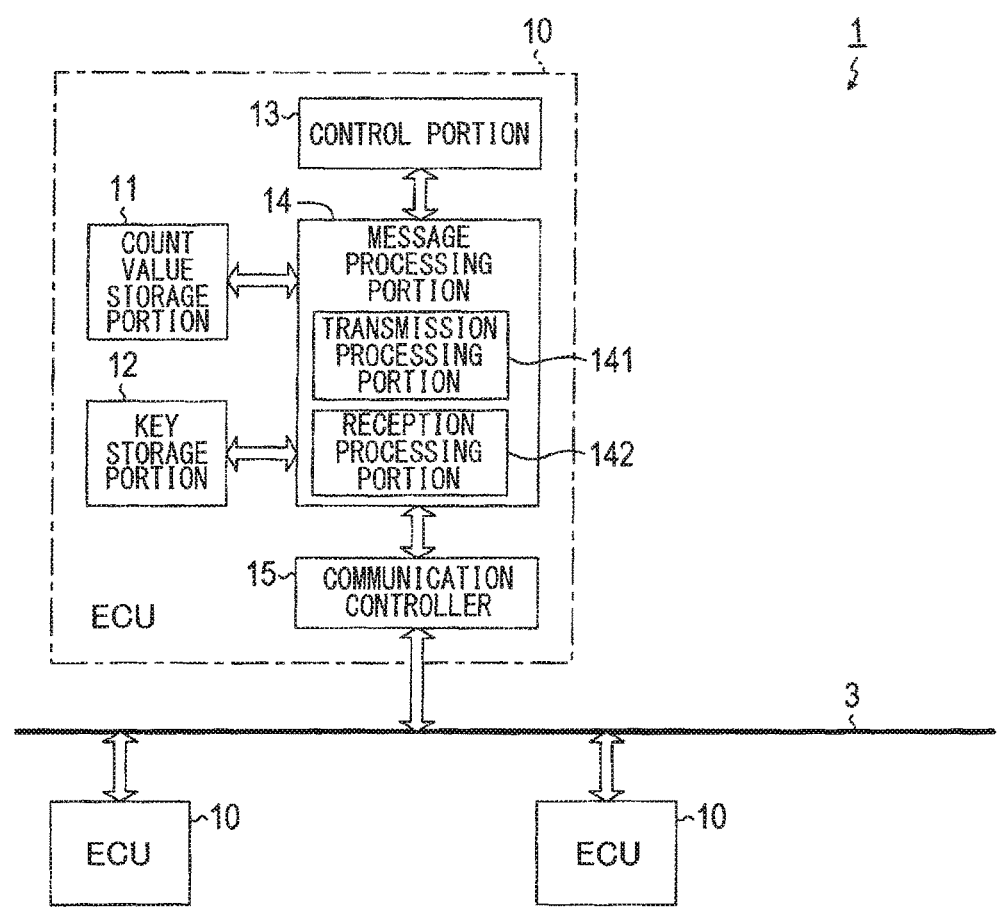
FIG. 1 is a block diagram showing an entire configuration of a communication system.

As shown in FIG. 1, a communication system 1 is equipped to a vehicle, and includes multiple nodes 10 and a communication path 3. The communication path is provided by a bus, and connects each of the nodes 10. In the communication system 1, an access control system, which is known as CSMA/CA system, is used. In the CSMA/CA system, on the communication path 3, the node 10 immediately stops transmitting a message when losing arbitration, and the node 10 keeps transmitting the message when winning the arbitration. In this configuration, the communication system 1 employs CAN protocol (ISO11898). The arbitration is executed by using identifier (CANID) assigned to a header section of the frame.

The node 10 is provided by an electronic control unit (ECU: Electronic Control Unit). Hereinafter, the node 10 is referred to as the ECU 10.

2. ECU

The ECU 10 includes a count value storage portion 11, a key storage portion 12, a control portion 13, a message processing portion 14, and a communication controller 15.

The communication controller 15 is provided by a publicly known CAN controller. The communication controller 15 transmits various types of messages supplied by the message processing portion 14 to the communication path 3. Herein, the message is stored in a communication frame in accordance with the CAN protocol. When receiving the communication frame, which is assigned with CANID designating own ECU 10, from the communication path 3, the communication controller 15 extracts the message from the received communication frame and supplies the message to the message processing portion 14. In the communication frame, CANID is assigned corresponding to a type of message.

The count value storage portion 11 is provided by a readable and writable non-volatile memory or a volatile memory. The count value storage portion 11 includes an area storing a count value of a communication counter and a count value of a temporary counter.

Figure 2:
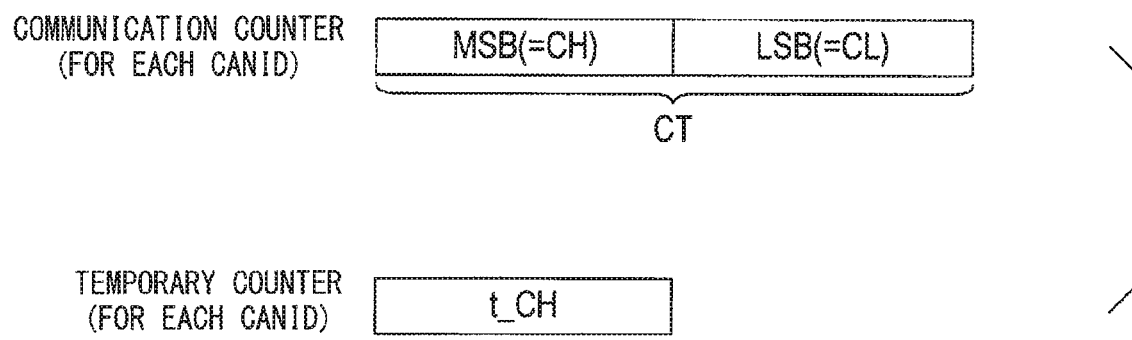
FIG. 2 is a diagram showing a configuration of a counter.

As shown in FIG. 2, the communication counter has predetermined bits (in the present embodiment, 64 bits), and the predetermined bits are used for generating a message authentication code (MAC). The MAC will be described later. A count value CT of the communication counter is divided into high-order 48 bits and low-order 16 bits. The count value on most significant bit (MSB) side is defined as a high-order count value CH, and the count value on least significant bit (LSB) side is defined as a low-order count value CL.

The count value CT of the communication counter is set corresponding to each CANID, which is set as transmission target or reception target of the own ECU 10. In each ECU 10, one CANID is capable of designating either transmission or reception. Thus, each communication counter set corresponding to CANID operates as either a transmission communication counter or a reception communication counter.

As shown in FIG. 2, the temporary counter has an identical bit width with a bit width of the high-order count value CH of the communication counter. Hereinafter, the count value of the temporary counter is indicated as t_CH. Similar to the communication counter, the temporary counter is also set corresponding to each CANID. The temporary counter is used only when the communication frame is designated as reception frame by the CANID.

The count value storage portion 11 functions as a transmission count value storage portion, and also functions as a reception count value storage portion.

The key storage portion 12 is provided by a readable and writable non-volatile memory. The key storage portion 12 stores predetermined bits (in the present embodiment, 128 bits) used for generating the MAC, which is known as a common key K. The common key K is commonly shared by each ECU 10, and is previously stored in the key storage portion 12 of each ECU 10.

The control portion 13 is provided by a publicly known computer. The control portion 13 executes various kinds of processing achieving functions previously assigned to the own ECU 10 by communicating with another ECU 10 via the message processing portion 14 and the communication controller 15 of the own ECU 10. The control portion 13 transmits and receives a data PDU to and from the message processing portion 14.

The message processing portion 14 includes a transmission processing portion 141 and a reception processing portion 142. The transmission processing portion 141 executes processing for transmitting the message to another ECU 10, that is, processing for achieving a function as a transmission node. The reception processing portion 142 executes processing for receiving the message from another ECU 10, that is, processing for achieving a function as a reception node. Each detail of the processing executed by the transmission processing portion 141 and the reception processing portion 142 will be described later.

3. Message Processing Portion

Figure 3:
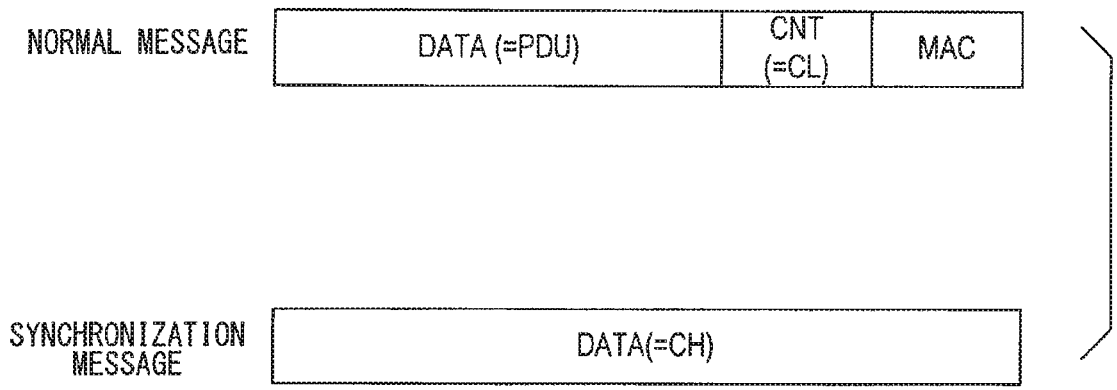
FIG. 3 is a diagram showing configurations of a normal message and a synchronization message.

FIG. 3 shows a message to be processed by the message processing portion 14. The message includes a normal message and a synchronization message.

As shown in FIG. 3, the normal message includes a DATA area, a CNT area, and a MAC area. The data area stores the data PDU. The CNT area stores the low-order count value CL. The MAC area stores a part of the MAC generated by information stored in the DATA area and the CNT area.

As shown in FIG. 3, the synchronization message is configured by only the DATA area. The DATA area stores the high-order count value CH.

Figure 4:
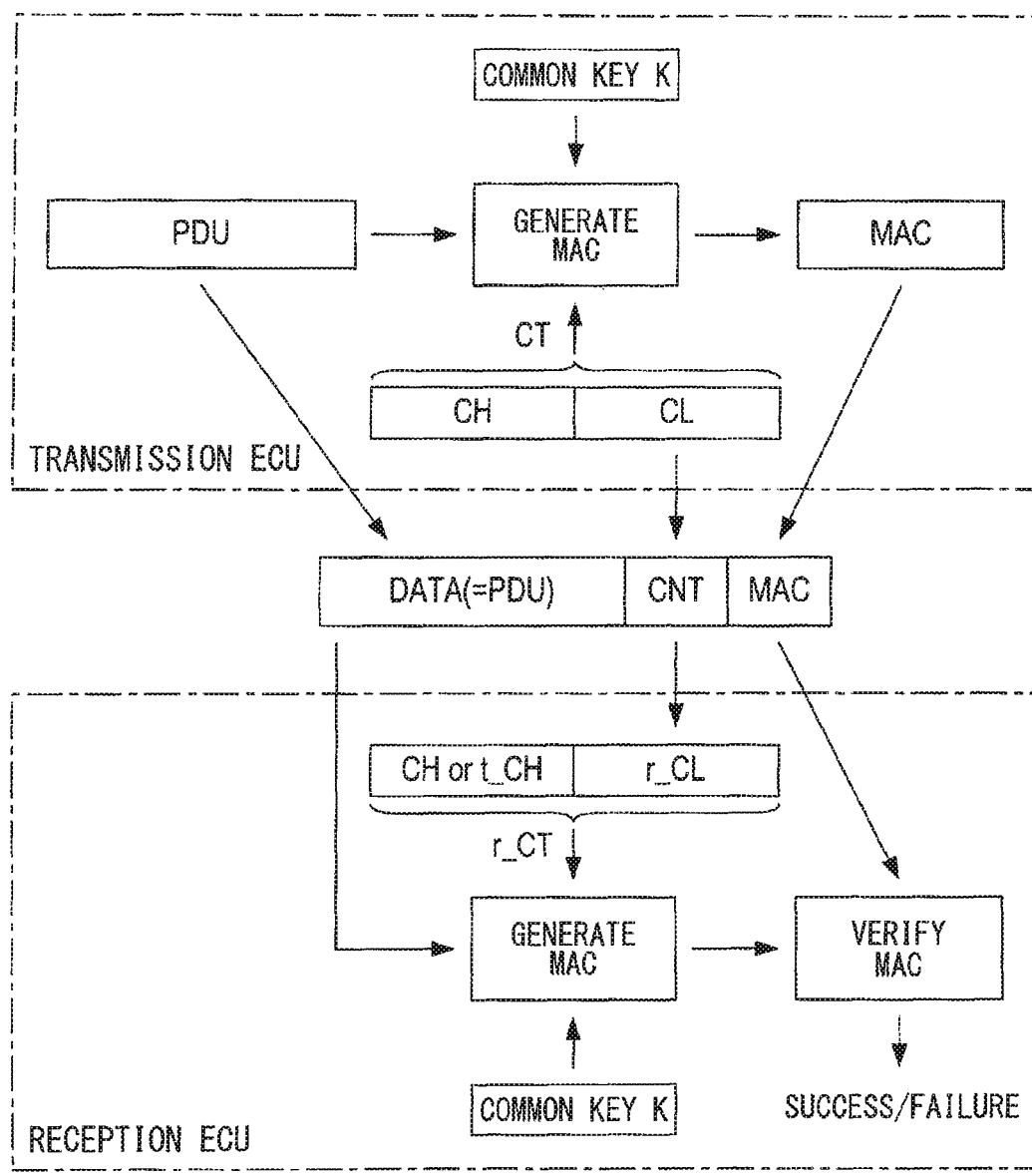
FIG. 4 is a diagram schematically showing processing executed by a message processing portion when the normal message is transmitted and received.

FIG. 4 shows a scheme of processing executed by the message processing portion 14 when the normal message is transmitted and received.

In a transmission ECU 10 transmitting the normal message, the message processing portion 14 generates the MAC by using the data PDU supplied from the control portion 13, the common key K stored in the key storage portion 12, and the count value CT (CH, CL) of the communication counter stored in the count value storage portion 11. The message processing portion 14 generates a message in which the data PDU is stored in the DATA area, the low-order count value CL is stored in the CNT area, and a part of generated MAC is stored in the MAC area. The message processing portion 14 transmits the generated message to the communication controller 15.

In a reception ECU 10 receiving the normal message through the communication controller 15, the message processing portion 14 generates MAC by using a value of the DATA area of the message, the common key K stored in the own key storage portion 12, and a count value r_CT. Herein, the count value r_CT is a value in which the high-order count value CH (or temporary count value t_CH) stored in the count value storage portion 11 is combined with the value (r_CL) of the CNT area of the received message as a low-order count value of the count value r_CT. The message processing portion 14 determines whether the count value r_CT is greater than the count value CT stored in the own reception ECU 10. The verification of the MAC is carried out by comparing the generated MAC with the value of the MAC area of the received message. When the message processing portion 14 authenticates integrity of the message, that is, MAC verification succeeds, the message processing portion 14 supplies the value of the DATA area of the message functioning as the data PDU to the control portion 13. When the message processing portion 14 fails to authenticate integrity of the message, the MAC verification is regarded as failure, and the received message is discarded.

Figure 5:
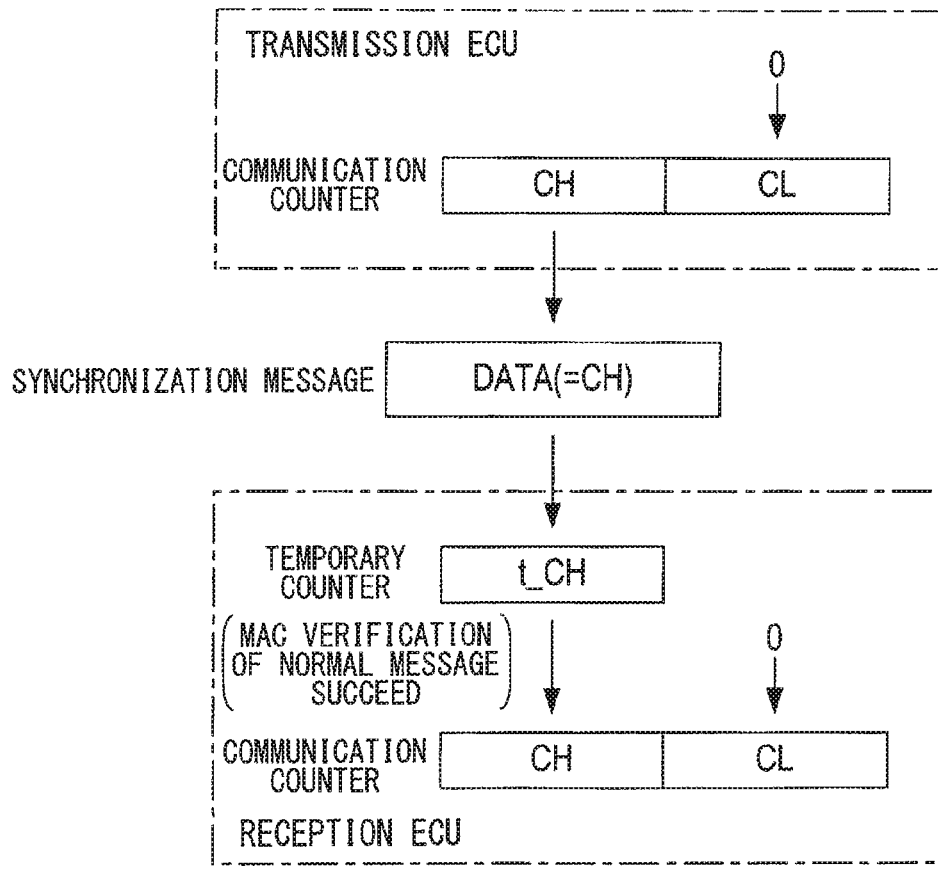
FIG. 5 is a diagram schematically showing processing executed by the message processing portion when the synchronization message is transmitted and received.

FIG. 5 shows a scheme of processing executed by the message processing portion 14 when the synchronization message is transmitted and received.

In the transmission ECU 10 transmitting the synchronization message, the message processing portion 14 generates a message in which the high-order count value CH of the communication counter stored in the count value storage portion 11 is stored in the DATA area. The generated message is supplied to the communication controller 15. In this case, the low-order count value CL is reset to zero.

In the reception ECU 10 receiving the synchronization message via the communication controller 15, the message processing portion 14 stores a value r_CH stored in the DATA area of the synchronization message as the count value t_CH of the temporary counter. The normal message received by the reception ECU 10 after the reception of the synchronization message is verified by using the count value t_CH of the temporary counter. When the message processing portion 14 determines the authentication of the normal message succeeds, the high-order count value CH of the communication counter is updated by the count value t_CH of the temporary counter, and the low-order count value CL is reset to zero.

3.1. Transmission Processing Portion

Figure 6:
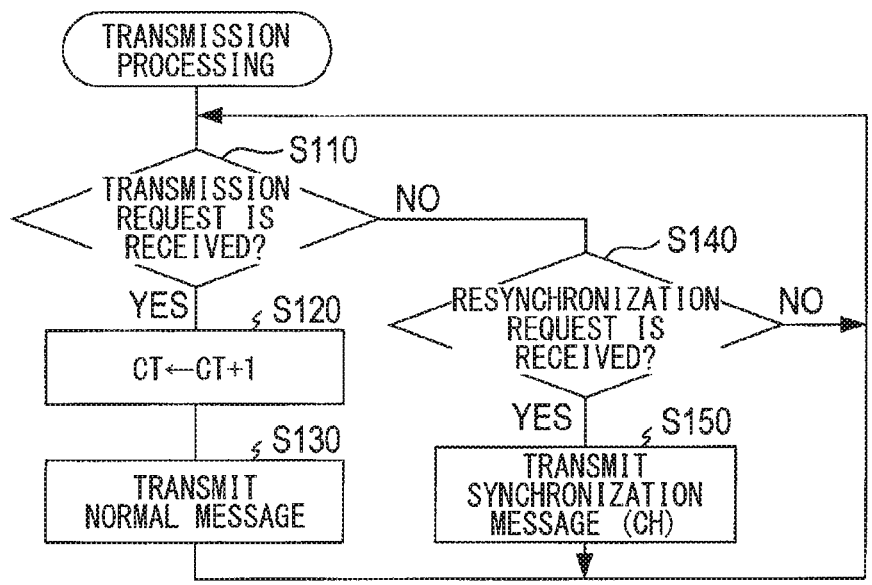
FIG. 6 is a flowchart showing processing executed by a transmission processing portion.

A flowchart in FIG. 6 shows processing executed by the transmission processing portion 141 of the ECU 10. The processing is activated when the power source of the ECU 10 is turned on.

When the processing is activated, in S110, the transmission processing portion 141 determines whether the control portion 13 transmits a transmission request. When the transmission processing portion 141 determines that the control portion 13 does not transmit the transmission request, the flowchart shifts to S140. In S140, the transmission processing portion 141 determines whether a resynchronization request from another ECU is received. When the transmission processing portion 141 determines that the resynchronization request from another ECU is not received, the flowchart returns to S110 and the transmission processing portion 141 waits until the transmission request or the resynchronization request is received.

In the above-described S110, when the transmission processing portion 141 determines that the control portion 13 transmits the transmission request, the flowchart shifts to S120. In S120, the transmission processing portion 141 identifies CANID related to a content of the transmission request, and increments the count value CT of the communication counter corresponding to the identified CANID by one (CT←CT+1).

In S130 following S120, the transmission processing portion 141 generates the normal message (see the transmission ECU in FIG. 4) by using the data PDU supplied by the control portion 13 and the count value CT incremented in S120. Herein, the data PDU is transmitted from the control portion 13 together with the transmission request. The transmission processing portion 141 transmits a generated normal message, and then the flowchart returns to S110.

In the above-described S140, when the transmission processing portion 141 determines the resynchronization request is received from another ECU, the flowchart shifts to S150. In S150, the transmission processing portion 141 generates the synchronization message (see the transmission ECU in FIG. 5) by using the high-order count value CH of the communication counter. The transmission processing portion 141 transmits the synchronization message, and then the flowchart returns to S110.

3.2. Reception Processing Portion

Figure 7:
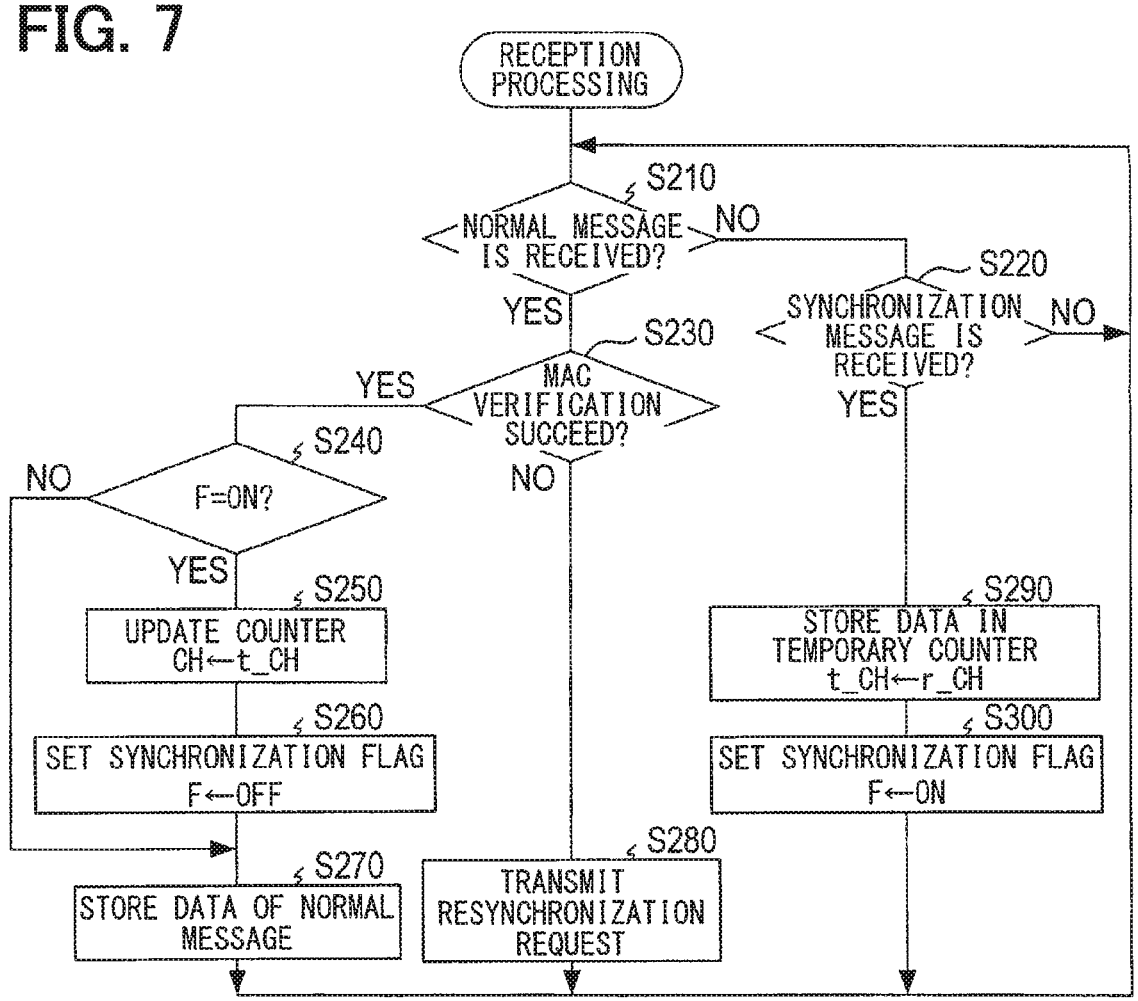
FIG. 7 is a flowchart showing processing executed by a reception processing portion.

A flowchart in FIG. 7 shows processing executed by the reception processing portion 142 of the ECU 10. The processing is activated when the power source of the ECU 10 is turned on.

When the processing is activated, in S210, the reception processing portion 142 determines whether the normal message is received. When the reception processing portion 142 determines that the normal message is not received, the flowchart shifts to S220. In S220, the reception processing portion 142 determines whether the synchronization message is received. When the reception processing portion 142 determines that the synchronization message is not received, the flowchart returns to S210 and the reception processing portion 142 waits until the normal message or the synchronization message is received.

S230 to S300, which will be described, represent the processing for the communication counter and the temporary counter set corresponding to the CANID related to the normal message or the synchronization message received by the reception processing portion 142.

In the above-described S220, when the reception processing portion 142 determines that the synchronization message is received, the flowchart shifts to S290. In S290, the reception processing portion 142 stores the value r_CH included in the DATA area of the synchronization message as the count value t_CH of the temporary counter.

In S300 following S290, the reception processing portion 142 sets a synchronization flag F to on state (F=ON), which represents the resynchronization being executed, and then the flowchart returns to S210.

In the above-described S210, when the reception processing portion 142 determines that the normal message is received, the flowchart shifts to S230. In S230, the reception processing portion 142 generates MAC based on a value stored in the DATA area of the normal message, the high-order count value stored in the own ECU 10 (CH in case of F=OFF, or t_CH in case of F=ON), the count value r_CT configured of the value r_CL stored in the CNT area, and the common key K stored in the key storage portion 12. The generated MAC is verified by being compared with the value stored in the MAC area of the normal message. When the MAC verification fails, the flowchart shifts to S280. In S280, the reception processing portion 142 transmits the resynchronization request to another ECU 10 which is the transmission source of the normal message, discards the received normal message, and then the flowchart returns to S210. When the MAC verification succeeds, the flowchart shifts to S240.

In S240, the reception processing portion 142 determines whether the synchronization flag F is set to on state (F=ON). When the reception processing portion 142 determines that the synchronization flag F is set to on state (F=ON), the flowchart shifts to S250. When the reception processing portion 142 determines that the synchronization flag F is set to off state (F=OFF), the flowchart shifts to S270 with skipping over S250 and S260.

In S250, the reception processing portion 142 updates the high-order count value CH stored in the count value storage portion 11 by the count value t_CH of the temporary counter, and resets the low-order count value CL to zero.

In S260 following S250, the reception processing portion 142 sets the synchronization flag F to off state.

In S270 following S260, the reception processing portion 142 regards the normal message as the verified message. The reception processing portion 142 extracts the data from the DATA area, and supplies the extracted data to the control portion 13 as the data PDU. The reception processing portion 142 increments the count value CT of the count value storage portion 11 by one (CT←CT+1). The flowchart returns to S210.

When receiving the synchronization message, the reception processing portion 142 stores the value r_CH included in the synchronization message in the temporary counter. After the reception processing portion 142 stores the value r_CH, when the MAC verification succeeds, the reception processing portion 142 stores the value t_CH, which is stored in the temporary counter, as the authentic high-order count value CH in the count value storage portion 11.

When a previous message received by the reception processing portion 142 is the synchronization message (that is, F=ON), the value t_CH stored in the temporary counter is used as the high-order count value r_CT for generating the verification purpose MAC. When the previous message received by the reception processing portion 142 is the normal message (that is, F=OFF), the value stored in the count value storage portion 11 CH is used as the high-order count value r_CT for generating the verification purpose MAC.

The processing executed by the transmission processing portion 141 and the reception processing portion 142 may be achieved by combination of logic circuits or the like. A part of or all of the processing executed by the transmission processing portion 141 and the reception processing portion 142 may be achieved by software program executed by a computer.

4. Operations

As described above, in the communication system 1, the ECU 10 manages the communication counter set corresponding to the type (CANID) of the message, and divides the communication counter into the high-order count value CH and the low-order count value CL. The transmission ECU 10 increments the count value CT each time transmitting the normal message, and transmits the normal message in which the low-order count value CL is included.

The reception ECU 10 stores the count value CT configured by count values CH and CL of the communication counter. When receiving the normal message, the reception ECU 10 verifies MAC by using the count value r_CT. Herein, the count value r_CT is configured by one of the high-order count value CH stored in the own ECU 10 or the temporary count value t_CH stored in the own ECU 10, and the value r_CL stored in the CNT area of the received normal message. The reception ECU 10 determines whether the count value r_CT is greater than the count value CT stored in the reception ECU 10. When MAC verification succeeds, the reception ECU 10 accepts the data stored in the DATA area of the normal message. When MAC verification fails, the reception ECU 10 transmits the resynchronization request to the transmission ECU 10.

The transmission ECU 10, which has received the resynchronization request, transmits the synchronization message in which the high-order count value CH is stored in the DATA area.

The reception ECU 10 receives the synchronization message and stores the value r_CH stored in the DATA area of the synchronization message as the temporary counter. When MAC verification of the normal message which employs the count value t_CH of the temporary counter succeeds, the count value t_CH is stored in the count value storage portion 11 as the authentic high-order count value CH.

5. Advantages

As described above, in the communication system 1, a part of the count value CT (only the high-order count value CH) is transmitted in the synchronization message. Herein, the synchronization message is transmitted in order to resynchronize the count value CT. In addition, the verification of the value r_CH (=t_CH) transmitted in the synchronization message is executed by the MAC verification of the normal message received later.

In CAN protocol, each communication frame has small capacity of data transmission. Since the data for verification is not included in the synchronization message, information necessary for the resynchronization can be transmitted in a single frame. The above configuration can secure safety and reliability of the information which is necessary for the resynchronization, and also can restrict communication data traffic during the resynchronization.

6. Other Embodiments

An exemplary embodiment of the present disclosure is disclosed as above. The present disclosure should not be limited to the above embodiment and may be executed in various other embodiments.

Figure 8:
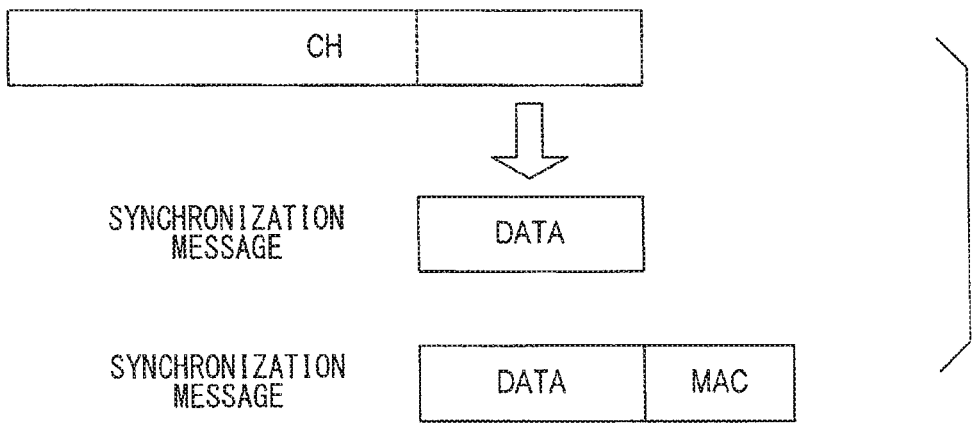
FIG. 8 is a diagram showing a configuration of a synchronization message according to another embodiment.

(1) In the above-described embodiment, the entire high-order count value CH is transmitted in the synchronization message. When the count value does not match between the reception ECU 10 and the transmission ECU 10, it is highly possible that only low-order bits of the high-order count value CH do not match between the reception ECU 10 and the transmission ECU 10. Thus, as shown in a middle part of FIG. 8, only low-order bits (for example, two or three bits) in the high-order count value CH may be transmitted. In this case, the synchronization message has a room for storing other information in addition to the partial high-order count value CH. Thus, as shown in a bottom part of FIG. 8, the synchronization message may store a part of MAC generated with use of the high-order count value CH. With this configuration, the reception ECU 10 can verify the update value of the high-order count value by only the synchronization message.

(2) In the above embodiments, a function executed by one element may be divided into multiple sub elements, and multiple functions executed by multiple elements may be integrated to one element. In the above embodiments, a part of a configuration may be omitted. In the above embodiments, at least a part of a configuration described in one embodiment may be added to or replaced by different configuration in another embodiment.

(3) The present disclosure may include other embodiments except for the above-described embodiments. For example, the embodiments may include a node (ECU) configuring the communication system, a program executed for controlling a computer to function as the message processing portion of the node, a storage medium storing the program, and an update method of the counter used in message verification.

The invention claimed is:

1. A communication system comprising:
a plurality of nodes connected with each other, wherein:
each of the plurality of nodes generates a message authentication code using a count value of a counter, an integrity of a message transmitted and received among the plurality of nodes being authenticated using the message authentication code,
the plurality of nodes include a transmission node and a reception node, the transmission node transmitting the message, the reception node receiving the message, the count value of the counter including a high-order count value and a low-order count value, the high-order count value corresponding to a high-order of the count value of the counter, and the low-order count value corresponding to a low-order of the count value of the counter,
the transmission node includes:
a transmission count value storage portion storing the count value;
a normal message generation portion incrementing the count value stored in the transmission count value storage portion each time a transmission request to another node is received, and generating a normal message to include a transmission data, the low-order count value, and the message authentication code, wherein the transmission data is related to the transmission request, the low-order count value is acquired from the transmission count value storage portion, and the message authentication code is generated based on the transmission data and the count value stored in the transmission count value storage portion; and
a synchronization message generation portion generating a synchronization message in response to a resynchronization request transmitted from the reception node,
the reception node includes:
a reception count value storage portion storing the count value;
a message verification portion verifying the normal message that is received by verifying the message authentication code based on a content of the normal message and the count value stored in the reception count value storage portion;
a resynchronization request portion transmitting the resynchronization request of the counter to the transmission node when the message verification portion fails to authenticate an integrity of the normal message; and
a count value update portion updating the high-order count value stored in the reception count value storage portion when the synchronization message is received,
the count value update portion temporarily stores the high-order count value included in the synchronization message in a temporary storage portion when the synchronization message is received, and
when the message verification portion succeeds in authenticating the integrity of a normal message that is received after receiving the synchronization message, by verifying the message authentication code based on a content of the normal message and the high-order count value stored in the temporary storage portion, the count value update portion updates the high-order count value stored in the reception count value storage portion.

2. The communication system according to claim 1, wherein
the synchronization message generated by the synchronization message generation portion includes the high-order count value stored in the transmission count value storage portion, and
the count value update portion updates the high-order count value stored in the reception count value storage portion with the high-order count value included in the synchronization message.

3. The communication system according to claim 1, wherein
the synchronization message generation portion generates the synchronization message to include a part of the high-order count value.

4. The communication system according to claim 3, wherein the synchronization message includes the message authentication code generated using the high-order count value, and the count value update portion updates the high-order count value stored in the reception count value storage portion when an integrity of the synchronization message is successfully authenticated using the message authentication code included in the synchronization message.

5. The communication system according to claim 1, wherein the message verification portion verifies the normal message by generating the message authentication code from (i) the transmission data included in the normal message, (ii) the low-order count value included in the normal data, and (iii) the high-order count value stored in the temporary storage portion, and comparing the message authentication code included in the normal message with the generated message authentication code.

6. A count value synchronization method of a communication system, wherein the communication system includes a plurality of nodes connected with each other, each of the plurality of nodes generating a message authentication code using a count value of a counter, an integrity of a message transmitted and received among the plurality of nodes being authenticated using the message authentication code, the plurality of nodes including a transmission node and a reception node, the transmission node transmitting the message, the reception node receiving the message, the count value of the counter including a high-order count value and a low-order count value, the high-order count value corresponding to a high-order of the count value of the counter, and the low-order count value corresponding to a low-order of the count value of the counter, the count value synchronization method comprising:

incrementing the count value stored in the transmission node each time a transmission request to another node is received;

generating, in the transmission node, a normal message to include a transmission data, the low-order count value, and the message authentication code each time the transmission request to another node is received, wherein the transmission data is related to the transmission request, the low-order count value is acquired from the transmission node, and the message authentication code is generated based on the transmission data and the count value stored in the transmission node;

generating, in the transmission node, a synchronization message in response to a resynchronization request transmitted from the reception node;

verifying, in the reception node, the normal message that is received by verifying the message authentication code based on a content of the normal message and the count value stored in the reception node;

transmitting, from the reception node, the resynchronization request of the counter to the transmission node when the verifying of the normal message fails to authenticate an integrity of the normal message; and updating the high-order count value stored in the reception node when the synchronization message is received, the updating the high-order count value including:

temporarily storing the high-order count value included in the synchronization message in a temporary storage portion when the synchronization message is received, and when succeeding in verifying a normal message that is received after receiving the synchronization message, by verifying the message authentication code based on the content of the normal message and the high-order count value stored in the temporary storage portion, updating the high-order count value stored in the reception node.

7. A program product stored in a non-transitory tangible computer readable storage medium, the program product comprising instructions to be executed by a computer, the instructions controlling the computer to function as a reception node in a communication system, the instructions comprising:

verifying a normal message that is received by verifying a message authentication code based on a content of the normal message and a count value stored in the reception node;

transmitting a resynchronization request of a counter to a transmission node when the verifying of the normal message fails to authenticate an integrity of the normal message; and updating a high-order count value stored in the reception node when a synchronization message is received, the updating the high-order count value including:

temporarily storing the high-order count value included in the synchronization message in a temporary storage portion when the synchronization message is received, and when succeeding in verifying a normal message that is received after the synchronization message is received, by verifying the message authentication code based on the content of the normal message and the high-order count value stored in the temporary storage portion, updating the high-order count value stored in the reception node.

* * * * *